US012593844B2

(12) United States Patent
Kyndt et al.

(10) Patent No.: US 12,593,844 B2
(45) Date of Patent: Apr. 7, 2026

(54) METHOD AND COMPOUNDS TO INDUCE PLANT TOLERANCE AGAINST ARTHROPOD PESTS

(71) Applicants: Universiteit Gent, Ghent (BE); VIB VZW, Zwijnaarde (BE)

(72) Inventors: Tina Kyndt, Ghent (BE); Bartel Vanholme, Oostakker (BE); Thomas Van Leeuwen, Mariakerke (BE); Willem Desmedt, Aalter (BE)

(73) Assignees: VIB VZW, Zwijnaarde (BE); UNIVERSITEIT GENT, Ghent (BE)

( * ) Notice: Subject to any disclaimer, the term of this patent is extended or adjusted under 35 U.S.C. 154(b) by 1135 days.

(21) Appl. No.: 17/413,204

(22) PCT Filed: Dec. 17, 2019

(86) PCT No.: PCT/EP2019/085583

§ 371 (c)(1),
(2) Date: Jun. 11, 2021

(87) PCT Pub. No.: WO2020/127216

PCT Pub. Date: Jun. 25, 2020

(65) Prior Publication Data

US 2022/0039382 A1 Feb. 10, 2022

(30) Foreign Application Priority Data

Dec. 18, 2018 (EP) .................................... 18213404

(51) Int. Cl.
*A01N 43/30* (2006.01)
*A01P 7/02* (2006.01)
*A01P 7/04* (2006.01)

(52) U.S. Cl.
CPC ................ *A01N 43/30* (2013.01); *A01P 7/02* (2021.08); *A01P 7/04* (2021.08)

(58) Field of Classification Search
None
See application file for complete search history.

(56) References Cited

U.S. PATENT DOCUMENTS 4,291,058 A 9/1981 Suchy

FOREIGN PATENT DOCUMENTS

GB 716519 10/1954
GB 805743 12/1958
JP S49100218 A 9/1974

OTHER PUBLICATIONS

Schoch et al (Plant Physiology, Oct. 2002, vol. 130, pp. 1022-1031) (Year: 2002).*
Ignacimuthu et.al. (Plant Signaling & Behavior; Nov. 2011; 1787-1792; Nov. 2011) (Year: 2011).*
Schoch et. al (Plant Physiology, Oct. 2002, vol. 130, pp. 1022-1031) (Year: 2002) (Year: 2002).*
Ignacimuthu et.al. (Plant Signaling & Behavior; Nov. 2011; 1787-1792; Nov. 2011) (Year: 2011) (Year: 2011).*
Novotny et al., "Guild-specific patterns of species richness and host specialiation in plan-herbivore food webs from a tropical forest", Journal of Animal Ecology, vol. 79, pp. 1193-1203, 2010.
Schalk et al., "Piperonylic Acid, a Selective, Mechanism-Based Inactivator of the trans-Cinamate 4-Hydroxylase: A New Tool to Control the Flux of Metabolites in the Phenylpropanoid Pathway", Plan Physiol., vol. 118, pp. 209-218, 1998.
Schoch et al., "Chemical Inactivation of the Cinnamate 4-Hydroxylase Allows for the Accumulation of Salicylic Acid in Elicited Cells", Plant Physiology, vol. 130, pp. 1022-1031, Oct. 2002.
Steenackers et al., "The Allelochemical MDCA Inhibits Lignification and Affects Auxin Homeostasis", Plant Physiology, vol. 172, pp. 847-888, Oct. 2016.
Van De Wouwer et al., "Chemical Genetics Uncovers Novel Inhibitors of Lignification, including p-Iodobenzoic Acid Targeting Cinnamate-4-Hydroxylase", Plant Physiology, vol. 172, pp. 198-220, Sep. 2016.
International Search Report and Written Opinion pertaining to Application No. PCT/EP2019/085583 dated Apr. 21, 2020.

* cited by examiner

*Primary Examiner* — John S Kenyon
*Assistant Examiner* — Rehana Ismail
(74) *Attorney, Agent, or Firm* — DINSMORE & SHOHL LLP

(57) ABSTRACT

The present invention is in the field of agricultural pathogen control. More specifically the invention relates to methods and compounds for controlling herbivorous arthropods, in particular insects and mites. The invention also provides for compositions comprising the same, methods of making the same, and methods of controlling plant disease.

18 Claims, 3 Drawing Sheets

METHOD AND COMPOUNDS TO INDUCE PLANT TOLERANCE AGAINST ARTHROPOD PESTS

CROSS REFERENCES TO RELATED APPLICATIONS

This application is a national-stage application under 35 U.S.C. § 371 of International Application No. PCT/EP2019/085583, filed Dec. 17, 2019, which International Application claims benefit of priority to European Application No. 18213404.9, filed Dec. 18, 2018.

FIELD OF THE INVENTION

The present invention is in the field of agricultural arthropod pathogen control. More specifically the invention relates to compounds for controlling plant pests, in particular insects and mites. The invention also provides for compositions comprising the same, methods of making the same, and methods of controlling plant disease.

BACKGROUND OF THE INVENTION

Numerous commercially valuable plants, including common agricultural crops, are susceptible to attack by plant pests including arthropod pests, causing substantial reductions in crop yield and quality. For example, plant pests are a major factor in the loss of the world's important agricultural crops. In addition to losses in field crops, arthropod pests are also a burden to vegetable and fruit growers, to producers of ornamental flowers, and to home gardeners. They can significantly impact the yield of important row crops including, for example, corn, soybeans, cotton and certain other types of vegetables. Examples of insect pests that can have a destructive impact on these crops include, but are not limited to, the cotton bollworm (*Helicoverpa armigera*), the tobacco whitefly (*Bemisia tabaci*), the diamondback moth (*Plutella xylostella*), the red flour beetle (*Tribolium castaneum*), the green peach aphid (*Myzus persicae*), the armyworm (*Spodoptera* spp.), the western flower *thrips* (*Frankliniella occidentalis*) and the brown planthopper (*Nilaparvata lugens*). Examples of highly destructive mites include, but are not limited to, the two-spotted spider mite (*Tetranychus urticae*), the tomato russet mite (*Aculops lycopersici*), the European red mite (*Panonychus ulmi*), the citrus red mite (*Panonychus citri*), flat mites such as *Brevipalpus* sp and tarsonemid mites such as the rice panicle mite (*Steneotarsonemus spinki*).

Insect and/or mite pests are mainly controlled by intensive applications of chemical pesticides, which are active through inhibition of insect growth, prevention of insect feeding or reproduction, or cause death. Biological pest control agents, such as predatory insects or entomopathogenic nematodes, have also been applied to protect crop plants against mites and insects in contained environments such as greenhouses offering an alternative or compliment to chemical pesticides.

Good insect control can thus be reached, but certain chemicals can sometimes also affect non-target beneficial insects and certain biologicals have a very narrow spectrum of activity. In addition, the continued use of certain chemical control methods heightens the chance for arthropod pests to develop resistance to such control measures. This has been partially alleviated by various resistance management practices, but there remains a need to discover new and effective pest control agents that provide an economic benefit to farmers and that are environmentally acceptable. Particularly needed are control agents that are targeted to a wider spectrum of economically important pests and that efficiently control arthropod strains that are or could become resistant to existing control agents.

Additional factors relating to the disadvantages of current control strategies include heightened concern for the sustainability of agriculture, and new government regulations that may prevent or severely restrict the use of many available agricultural chemical insecticides and acaricides. These agents may also accumulate in the water table or the food chain, and in higher trophic level species. These agents may also act as mutagens and/or carcinogens to cause irreversible and deleterious genetic modifications in non-target organisms.

Thus, alternative methods for controlling arthropod pests in plants and crops are needed.

SUMMARY OF THE INVENTION

The present invention provides compounds for controlling insect and/or mite pests in plants, in particular to limit insect and/or mite damage in plants.

Of particular advantage is that these compounds pre-emptively activate the innate immune response in plants in order to enhance the plant immunity, resulting in pathogen control.

Non-limiting examples of insect pests that may be controlled by the methods, compounds and uses described herein include members of the orders Coleoptera, Diptera, Hemiptera, Thysanoptera and Lepidoptera.

The compound of the invention has the general Formula I, Ie, II, III or IV as disclosed herein, or either one of the Formulas of the subgroup Ia-e and IIa-e. Preferred are the compounds represented by Formula I, II and III. In particular, the compound is selected from the group consisting of: piperonylic acid (PA) (or optionally a precursor thereof such as 3,4-methylenedioxycinnamic acid (MDCA)); 4-iodobenzoic acid (4-IBA); 4-trifluoromethylbenzoic acid; 4-propynyloxybenzoic acid (4-PB) and 3-(4-pyridyl)acrylic acid (3PA); or a stereoisomer, tautomer, hydrate, salt, ester, solvate and/or functional analog thereof. More in particular, the compound is piperonylic acid, or a stereoisomer, tautomer, hydrate, salt, ester, solvate, or functional analog thereof. Suitable concentrations of the compound in the methods and uses as provided herein are in the range of about 0.1 to 1000 μM, in particular 1 to 800 μM, more in particular 10 to 500 μM.

The invention further discloses the use of the compounds described herein for preventing, treating and/or reducing infection of plants with arthropod pests, such as insects and/or mites, and/or to control (e.g. prevent or reduce) plant damage caused thereby.

In a further embodiment, the present invention discloses a composition or formulation comprising a compound as described herein and a diluent, an additive, a plant (micro) nutrient, an emulsion stabilizer, a surfactant, a buffer, a crop oil, a drift inhibitor and/or an (inert) substratum. In particular, the composition is a foliar spray or a seed coating. Furthermore, the compounds or compositions can further comprise or be used in combination with one or more fertilizers, biostimulants, herbicides, fungicides, bactericides, acaricides, nematicides and/or insecticides. In particular the composition is an agrochemical composition comprising any one or more of the compounds of formula I, Ia-e, II, IIa-e, III or IV, and at least one excipient.

In another embodiment, the compound or composition is applied to or on a plant or part thereof, or to the soil surrounding the plant. Preferred application methods are foliar treatment (e.g. by spraying), seed treatment (e.g. by seed coating), soil treatment (e.g. by soil drenching) or addition to the growth substrate. Plant parts can be a seed, fruit, fruit body, leaf, stem, shoot, stalk, flower, root, tuber or rhizome.

The invention further relates to a seed comprising a coat including a compound as provided herein and a method for controlling (e.g. preventing, inhibiting or treating infection of plants with) plant pathogens such as the arthropod pests as provided herein, said method comprising applying a compound of the invention to said plant.

DESCRIPTION OF THE INVENTION

Figure 1:
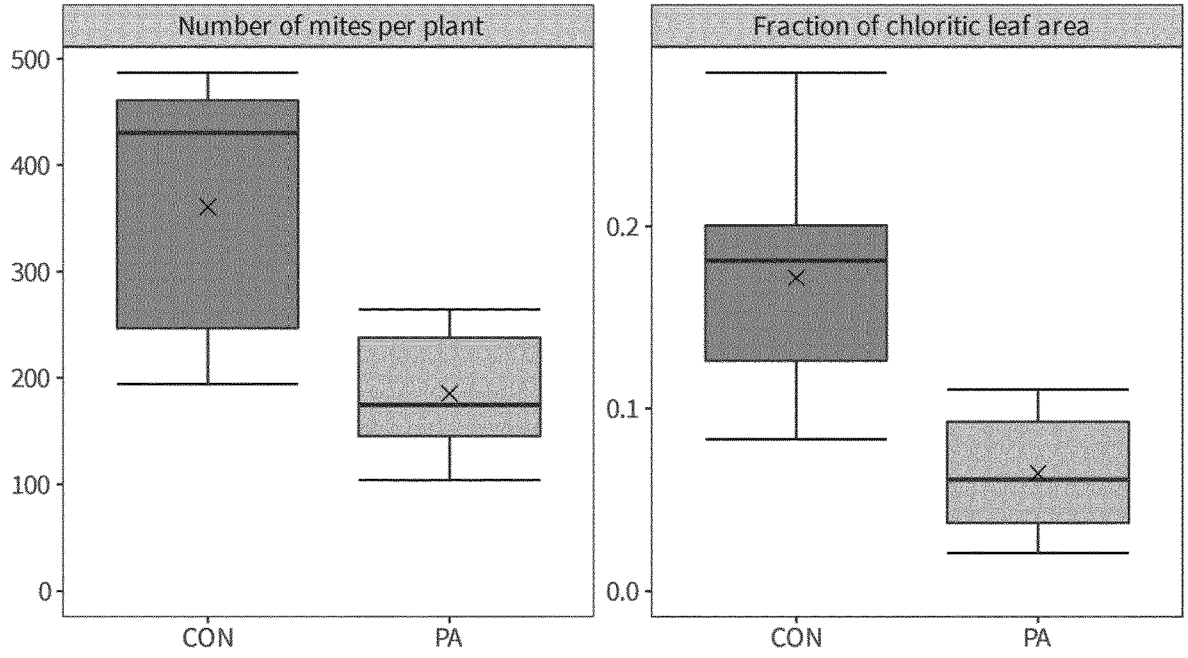
FIG. 1: box plots of the number of mites per leaf (left) and chlorotic area as a percentage of total leaf area (right) in tomato leaves of plants treated with 300 μM piperonylic acid (PA) or a water control treatment (CON) ten days after inoculation with ten *Tetranychus urticae* females. N=8.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The term "about" as used herein when referring to a measurable value such as a parameter, an amount, a temporal duration, and the like, is meant to encompass variations of +/−20% or less, preferably +1-10% or less, more preferably +/−5% or less, of and from the specified value, insofar such variations are appropriate to perform in the disclosed invention. It is to be understood that the value to which the modifier "about" refers is itself also specifically, and preferably, disclosed. Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any >3, >4, >5, >6 or >7 etc. of said members, and up to all said members. All references, and teachings specifically referred to, cited in the present specification are hereby incorporated by reference in their entirety. Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention.

The present invention provides methods, compounds and compositions to control arthropod pests in plants, in particular insects and/or mites that are detrimental to plants. As used herein, to "control" insects/mites means to (indirectly) inhibit the ability of insect or mite pests to survive, grow, feed, and/or reproduce, or to limit insect and/or mite-related damage or loss in crop plants, or to protect the yield potential of a crop when grown in the presence of insect and/or mite pests.

Of particular advantage is that these methods and compounds pre-emptively stimulate plant defense and/or immune responses against pathogenic insects and mites. By acting via the plant, these compounds have a minimal impact on beneficial (soil) organisms, thereby making them more suitable crop protection agents. The present invention demonstrates that the compounds indirectly inhibit the reproduction of insects or mites feeding on the treated plant (e.g. reduction in the amount of eggs or nymphs), and that the damage caused to the plant (e.g. as measured by the damaged leaf area or root damage) is reduced. Remarkably, it was demonstrated that these compounds have a positive effect on plant growth and more specific on for example root and shoot development (e.g. increased number and/or height), seed production and/or crop yield under insect/mite-pressure. The present invention demonstrates that the compounds inhibit the development and reproduction of insects or mites feeding on treated plants, and that the damage caused to the plant is reduced.

The compounds provided herein are capable of inhibiting/inactivating of cinnamate-4-hydroxylase (C4H) (NCBI Reference Sequence: NP_180607.1), the second enzyme of the phenylpropanoid pathway and a member of the superfamily of Cytochrome P450 heme-thiolate proteins (Schalk et al., 1998). Hence the compounds operate by stimulating the plant defense mechanism through selective perturbation of the phenylpropanoid pathway.

In a particular embodiment, the present invention provides a method of enhancing plant immunity against herbivorous insects and/or mites, in particular by inhibition or inactivation of the enzyme C4H, said method comprising the step of administering to a plant a(n) (exogenous) compound, in particular a small molecule, capable of disrupting the function or activity of C4H, e.g. by binding C4H. As used herein a "cinnamate-4-hydroxylase (C4H) inhibitor" relates to a compound capable of reducing or inhibiting C4H activity in planta. As used herein the term "inhibition of the activity of C4H" or "inhibiting C4H" shall be interpreted to mean any change in a level of synthesis of the functional C4H enzyme or a C4H biological activity, which can include a reduced level of functional C4H enzyme present in a plant cell, reduced efficacy of the C4H enzyme, or any other means which affects one or more of the biological properties of a C4H enzyme such as e.g. its role in the conversion of trans-cinnamic acid into 4-hydroxycinnamic acid in plants.

The term "improved resistance to disease," as used herein, refers to an increase of plant defense in a healthy plant (cf. preventive measure) or a decrease in disease severity of a plant or a population of plants, or in the number of affected plants in a plant population.

Techniques for measuring and determining the (effect on) activity of C4H are well known to the one of ordinary skill in the art. Useful methods to determine inhibition of C4H activity are (incorporated by reference):

- Measurement of the conversion efficiency of trans-cinnamic acid labeled with $^{13}C$ or $^{14}C$ in the presence of a potential C4H inhibitor in plant cell cultures or in yeast microsomes in which the CYP73A1 is expressed (as described in Schoch et al. 2002; Van de Wouwer et al. 2016; Schalk et al. 1998). Representative inhibition kinetics values obtained in cell suspensions for both competitive and irreversible C4H inhibitors can be found in Table 1 in Schoch et al., 2002 (incorporated by reference).
- Inhibition of the C4H enzyme increases the concentration of free trans-cinnamic acid, which is rapidly conjugated in planta. The accumulation of trans-cinnamic acid amino acid conjugates, which can be quantified using HPLC-MS, can be used as a proxy measure for C4H inhibition in planta. This approach is outlined in Steenackers et al. 2016. Briefly, *A. thaliana* seedlings are grown in vitro on medium containing 10 μM of the suspected C4H inhibitor, after which they are collected, pooled and subjected to HPLC analysis. Representative values for the increase in the quantity of trans-cinnamic acid conjugates are found in Supplemental Figure S2 in Steenackers et al. 2016 (incorporated by reference).
- Inhibition of the C4H enzyme causes a compensatory upregulation of the C4H gene, as shown in Example 20. Fourteen-day old rice plants (*Oryza sativa* cv. *Bomba*) treated with foliarly twenty-four and three hours prior to harvest with 100 μM of PA and MDCA showed a ten-fold and three-fold increase of C4H expression in the root system respectively.
- Primary root elongation of *Arabidopsis thaliana* seedlings upon continuous exposure to C4H inhibitors is greatly reduced. The IC50-root, the dose of candidate-inhibitor required to reduce primary root elongation by 50%, can be another indirect measure of C4H inhibitor activity. This procedure is described in Steenackers et al. 2016. Reference IC50-root values for C4H inhibitors are 5.07 μM for MDCA (Steenackers et al. 2016) and 40.0 μM for PA (unpublished data).
- When *Arabidopsis thaliana* seedlings are grown in vitro with continuous exposure to 10 μM of a suspected C4H inhibitor, a clear impairment of lignification in the Casparian strip of five day old seedlings should be visible (fewer lignified cells). For reference, PA, MDCA and 4-IBA increase the number of non-lignified endodermal cells in the Casparian strip region by 134, 104 and 57% respectively (Van de Wouwer et al., 2016).

In planta assays are particularly useful to determine inhibition activity of structural analogs of the compounds provided herein, and of "C4H inhibitor precursors", i.e. compounds that are transformed in planta to an effective C4H inhibitor. In the context of the present invention, examples of precursors for piperonylic acid (PA) are 3,4-methylenedioxycinnamic acid (MDCA), piperic acid and piperine, preferably MDCA. Hence the invention also relates to the use of C4H inhibitor precursors in the methods, compositions and applications/uses as described herein.

In a specific embodiment, the compound of the invention is a small molecule. In one embodiment, the compound is an aromatic carboxylic acid or is characterized by the presence of a benzodioxole comprising a carboxylic acid group.

In particular, the compound of the present invention has the general Formula I, or a stereoisomer, tautomer, hydrate, salt or solvate thereof:

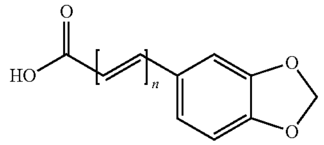

wherein n is 0, 1, 2, 3, or 4.

More in particular n is 0.

In a further embodiment the compound of the present invention has the general Formula II, or a stereoisomer, tautomer, hydrate, salt or solvate thereof:

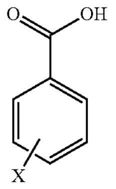

wherein X is a halogen or —R, wherein R is selected from —CF3, or —O—C1-6alkynyl. In a particular embodiment X is —I, and R is -4-O-propynyl, -3-O-propynyl or -4-CF3.

In another embodiment, the compound of the invention has the Formula III, or a stereoisomer, tautomer, hydrate, salt or solvate thereof:

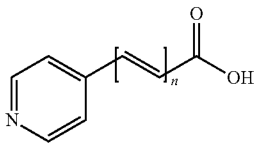

wherein n is 0, 1, 2, 3, or 4.

More in particular n is 1.

As used herein, the term "halogen" encompasses fluorine (F), chlorine (Cl), bromine (Br), or iodine (I), in particular iodine (I). The term "alkynyl", as used herein, means straight-chain or branched-chain hydrocarbon radicals containing at least one carbon-carbon triple bond. Examples of alkynyl radicals include ethynyl, propynyl, butynyl, isobutynyl, and pentynyl, hexynyl, and the like. In a particular embodiment, the alkynyl is a propynyl. An "optionally substituted alkynyl" refers to an alkynyl having optionally one or more substituents (for example 1, 2, 3 or 4) at any available point of attachment. Non-limiting examples of such substituents include halo, hydroxyl, carbonyl, nitro, amino, oxime, imino, azido, hydrazino, cyano, aryl, heteroaryl, cycloalkyl, acyl, alkylamino, alkoxy, thiol, alkylthio, carboxylic acid, acylamino, alkyl esters, carbamate, thioamido, urea, sullfonamido and the like. In a specific embodiment, the compound of the invention is selected from the group of compounds as presented in Table 1.

TABLE 1

| Name | Structure | Formula |
|---|---|---|
| Piperonylic acid (PA) | | Ia |
| 3,4-methylenedioxycinnamic acid (MDCA) | | Ib |
| 3,4-(Methylenedioxy)phenylacetic acid | 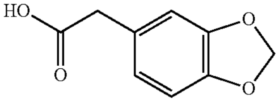 [SMILES: O=C(O)Cc1ccc2c(c1)OCO2] | Ic |
| Piperic acid | | Id |
| Piperine | 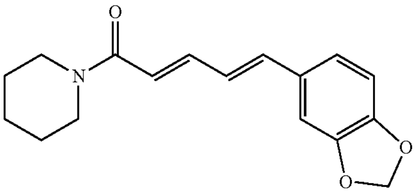 [SMILES: O=C(/C=C/C=C/c1ccc2c(c1)OCO2)N1CCCCC1] | Ie |
| 4-iodobenzoic acid (4-IBA) | 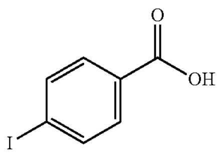 | IIa |
| 4-propynyloxybenzoic acid | 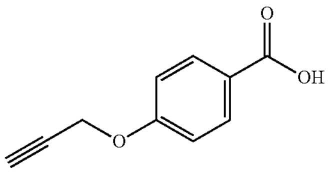 | IIb |
| 4-propynyloxymethylbenzoic acid | 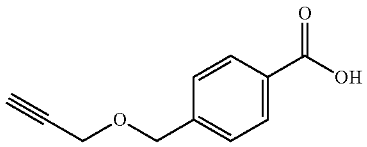 | IIc |
| 3-propynyloxybenzoic acid | 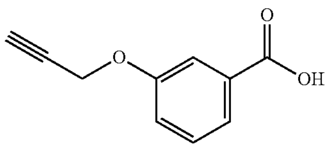 | IId |
| 4-trifluoromethylbenzoic acid | 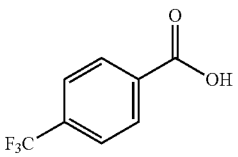 | IIe |
| 3-(4-pyridyl)-acrylic acid | 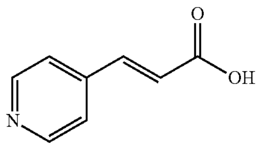 [SMILES: O=C(O)/C=C/c1ccncc1] | III |

TABLE 1-continued

| Name | Structure | Formula |
|---|---|---|
| 2-hydroxy-1-napthoic acid (2HN) | 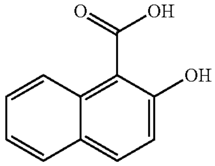 [SMILES: O=C(O)c1c(O)ccc2ccccc12] | IV |

Even more specific, the compound of the invention or C4H inhibitor is selected from the group consisting of: piperonylic acid (PA) (or optionally a precursor thereof); 4-iodobenzoic acid (4-IBA); 4-trifluoromethylbenzoic acid; 4-propynyloxybenzoic acid (4-PB) and 3-(4-pyridyl)acrylic acid (3PA); or a stereoisomer, tautomer, hydrate, salt, ester and/or solvate thereof. In a further embodiment, the compound is selected from the group consisting of piperonylic acid (PA), 3,4-methylenedioxycinnamic acid (MDCA), piperic acid and piperine, or a stereoisomer, tautomer, hydrate, salt, ester and/or solvate thereof. In another embodiment, the compound is selected from the group consisting of 4-iodobenzoic acid (4-IBA), 4-trifluoromethylbenzoic acid, 4-propynyloxymethylbenzoic acid, 4-propynyloxybenzoic acid (4-PB) and 3-propynyloxybenzoic acid, or a stereoisomer, tautomer, hydrate, salt, ester and/or solvate thereof. In still another embodiment, the compound is 3-(4-pyridyl)acrylic acid (3PA), or a stereoisomer, tautomer, hydrate, salt, ester and/or solvate thereof. A preferred compound is piperonylic acid (PA), or a stereoisomer, tautomer, hydrate, salt, ester, and/or solvate thereof, or optionally a functional analog thereof. Other compounds can be evaluated to be functional equivalent to the compounds of the invention, in particular PA, by using the assays as provided herein, e.g. the compound can be found to has a similar effect as the reference compound, e.g. PA, in at least 2 or 3 of the assays as described herein. Hence also envisaged in the present invention is a "functional equivalent or analog" of the compounds provided herein, being a compound having a minor structural difference compared to the reference compound (so called structural analog) but having the same envisaged function or property. In one embodiment, the functional analog is a small molecule characterized by the presence of an aromatic carboxylic acid or by the presence of a benzodioxole comprising a carboxylic acid group.

The term "compound(s) of the invention," and equivalent expressions, are meant to embrace the prodrugs, the pharmaceutically acceptable salts, the oxides, the solvates, e.g. hydrates, and inclusion complexes of that compound, where the context so permits, as well as any stereoisomeric or tautomeric form, or a mixture of any such forms of that compound in any ratio, unless otherwise specified. Furthermore, since the compounds of the invention carry an acidic moiety, suitable agrochemical acceptable salts thereof may include alkali metal salts, e.g. sodium or potassium salts; alkaline earth metal salts, e.g. calcium or magnesium salts; and salts formed with suitable organic ligands, e.g. quaternary ammonium salts. A salt can be any ionic compound that can be formed by the neutralization reaction of an acidic compound as provided herein and a base. Examples include, but or not limited to, an ammonium, a potassium or isopropylamine salt. In another embodiment, base salts are formed from bases which form non-toxic salts, including aluminum, arginine, benzathine, choline, diethylamine, diolamine, glycine, lysine, meglumine, olamine, tromethamine and zinc salts. In one embodiment, hemisalts of acids and bases may also be formed, for example, hemisulphate and hemicalcium salts. In a particular embodiment, the invention also encompasses esters derived from the compounds of the invention, i.e. wherein the —OH (hydroxyl) group of the carboxylic acid is replaced by an —O-alkyl (alkoxy) or other organic group. Hence, the carboxylic acid (—COOH) in Formulas I, II, III and IV (including individual compounds of the subgroups) is replaced by R1-O—C═O wherein R1 is C1-C4-alkyl. Examples include, but or not limited to, methyl, ethylhexyl or ethyl esters. Said esters can be of particular interest for a foliar application in view of enhanced penetration properties.

The invention provides methods, compounds and compositions for controlling arthropod herbivores, (also referred to as arthropod pests). The term "controlling" such herbivorous insects and/or mites refers to reducing the overall negative effect of herbivorous insects and/or mites on plants such that the plants experience a decreased amount of negative effects by said herbivores/pests as compared to plants not treated with the compound or composition. The overall negative effect by herbivorous insects and/or mites may be reduced, such as by reducing the overall number or density of herbivorous insects and/or mites (i.e., decrease in population, amount of eggs or insect/mite development) on the plant or in the soil or by reducing the severity or extent of negative effects of the pests (e.g. herbivory of plant parts, chlorosis, loss of phloem sap, growth reduction, yield losses, etc.), or the plant parasitic insects and/or mites (i.e. population exhibits reduced fitness). Moreover, the compounds can be used to improve plant yield and fertility under arthropod stress.

Herbivory is a form of consumption in which a heterotrophic organism consumes plants. Herbivorous insects and/or mites are arthropods that feed on plant tissues. They injure a plant by for example feeding on cell contents, chewing, sucking phloem sap or acting as vectors for viral plant diseases.

Non-limiting examples of insect pests that may be controlled by the methods, compounds and uses described herein include members of the Apterygota such as Archaeognatha (Order: Microcoryphia) and Three-pronged bristletails (Order: Thysanura); [Subclass] Pterygota such as [Division] Exopterygota e.g. Biting and Sucking lice (Order: Phthiraptera); Booklice and Barklice (Order: Psocoptera); Cockroaches (Order: Blattodea); Dragonflies and Damselflies (Order: Odonata); Earwigs (Order: Dermaptera); Grasshoppers and Crickets (Order: Orthoptera); Praying Mantids (Order: Mantodea); Mayflies (Order: Ephemeroptera); Stick insects and Leaf insects (Order: Phasmatodea); Stoneflies (Order: Plecoptera); Termites (Previously Order: Isoptera but now part of Order: Blattodea); *Thrips* (Order: Thysanoptera); True Bugs (Order: Hemiptera); Web-spinners (Order: Embioptera); Zorapterans (Order: Zoraptera); or [Division] Endopterygota such as Alderflies, Dobsonflies &

Fishflies (Order: Megaloptera); Bees, Wasps and Ants (Order: Hymenoptera); Beetles (Order: Coleoptera); Butterflies and Moths (Order: Lepidoptera); Caddisflies (Order: Trichoptera); Fleas (Order: Siphonaptera); Flies (Order: Diptera); Lacewings, Antlions & Mantidflies (Order: Neuroptera); Scorpionflies (Order: Mecoptera); Snakeflies (Order: Raphidioptera); and Strepsipterans (Order: Strepsiptera).

Examples of the members of the order Coleoptera include *Acalymma, Acanthoscelides, Adoretus, Agelastica, Agriotes, Alphitobius, Amphimallon, Anobium, Anoplophora, Anthonomus, Anthrenus, Apion, Apogonia, Atomaria, Attagenus, Bruchidius, Bruchus, Cassida, Cerotoma, Ceutorrhynchus, Chaetocnema, Cleonus, Conoderus, Cosmopolites, Costelytra, Ctenicera, Curculio, Cryptorhynchus, Cylindrocopturus, Dermestes, Diabrotica, Dichocrocis, Diloboderus, Epilachna, Epitrix, Faustinus, Gibbium, Hellula, Heteronychus, Heteronyx, Hylamorpha, Hylotrupes, Hypera, Hypothenemus, Lachnosterna, Lema, Leptinotarsa, Leucoptera, Lissorhoptrus, Lixus, Luperodes, Lyctus, Megascelis, Melanotus, Meligethes, Melolontha, Migdolus, Monochanus, Naupactus, Niptus, Oryctes, Oryzaephilus, Oryzaphagus, Otiorrhynchus, Oxycetonia, Phaedon, Phyllophaga, Phyllotreta, Popillia, Premnotrypes, Prostephanus, Psylliodes, Ptinus, Rhizobius, Rhizopertha, Sitophilus, Sphenophorus, Stegobium, Sternechus, Symphyletes, Tanymecus, Tenebrio, Tribolium, Trogoderma, Tychius, Xylotrechus*, and *Zabrus*.

Examples of the members of the order Diptera include *Aedes, Agromyza, Anastrepha, Anopheles, Asphondylia, Bactrocera, Bibio, Calliphora, Ceratitis, Chironomus, Chrysomyia, Chrysops, Cochliomyia, Contarinia, Cordylobia, Culex, Culicoides, Culiseta, Cuterebra, Dacus, Dasyneura, Delia, Dermatobia, Drosophila, Echinocnemus, Fannia, Gasterophilus, Glossina, Haematopota, Hydrellia, Hylemyia, Hyppobosca, Hypoderma, Liriomyza, Lucilia, Lutzomia, Mansonia, Musca, Nezara, Oestrus, Oscinella, Pegomyia, Phlebotomus, Phorbia, Phormia, Prodiplosis, Psila, Rhagoletis, Sarcophaga, Simulium, Stomoxys, Tabanus, Tannia, Tetanops*, and *Tipula*.

Examples of the members of the order Hemiptera (sub-order Heteroptera) include *Anasa tristis, Antestiopsis* spp., *Aphis* spp. *Bemisia* spp., *Boisea* spp., *Blissus* spp., *Calocoris* spp., *Campylomma livida, Cavelerius* spp., *Cimex* spp., *Cimex lectularius, Cimex hemipterus, Collaria* spp., *Creontiades dilutus, Dasynus piperic, Dichelops furcatus, Diconocoris hewetti, Dysdercus* spp., *Euschistus* spp., *Eurygaster* spp., *Heliopeltis* spp., *Horcias nobilellus, Leptocorisa* spp., *Leptoglossus phyllopus, Lygus* spp., *Macropes excavatus, Miridae, Monalonion atratum, Myzus* spp., *Nezara* spp., *Nilparvata* spp., *Oebalus* spp., *Pentomidae, Piesma quadrata, Piezodorus* spp., *Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp., *Acyrthosipon* spp., *Acrogonia* spp., *Aeneolamia* spp., *Agonoscena* spp., *Aleurodes* spp., *Aleurolobus barodensis, Aleurothrixus* spp., *Amrasca* spp., *Anuraphis cardui, Aonidiella* spp., *Aphanostigma piri, Aphis* spp., *Arboridia apicalis, Aspidiella* spp., *Aspidiotus* spp., *Atanus* spp., *Aulacorthum solani, Bemisia* spp., *Brachycaudus helichrysii, Brachycolus* spp., *Brevicoryne brassicae, Calligypona marginata, Carneocephala fulgida, Ceratovacuna lanigera, Cercopidae, Ceroplastes* spp., *Chaetosiphon fragaefolii, Chionaspis tegalensis, Chlorita onukii, Chromaphis juglandicola, Chrysomphalus flcus, Cicadulina mbila, Coccomytilus halli, Coccus* spp., *Cryptomyzus ribis, Dalbulus* spp., *Dialeurodes* spp., *Diaphorina* spp., *Diaspis* spp., *Drosicha* spp., *Dysaphis* spp., *Dysmicoccus* spp., *Empoasca* spp., *Eriosoma* spp., *Erythroneura* spp., *Euscelis bilobatus, Ferrisia* spp., *Geococcus coffeae, Hieroglyphus* spp., *Homalodisca coagulata, Hyalopterus arundinis, Icerya* spp., *Idiocerus* spp., *Idioscopus* spp., *Laodelphax striatellus, Lecanium* spp., *Lepidosaphes* spp., *Lipaphis erysimi, Macrosiphum* spp., *Mahanarva* spp., *Melanaphis sacchari, Metcalfiella* spp., *Metopolophium dirhodum, Monellia costalis, Monelliopsis pecanis, Myzus* spp., *Nasonovia ribisnigri, Nephotettix* spp., *Nilaparvata lugens, Oncometopia* spp., *Orthezia praelonga, Parabemisia myricae, Paratrioza* spp., *Parlatoria* spp., *Pemphigus* spp., *Peregrinus maidis, Phenacoccus* spp., *Phloeomyzus passerinii, Phorodon humuli, Phylloxera* spp., *Pinnaspis aspidistrae, Planococcus* spp., *Protopulvinaria pyriformis, Pseudaulacaspis pentagona, Pseudococcus* spp., *Psylla* spp., *Pteromalus* spp., *Pyrilla* spp., *Quadr aspidiotus* spp., *Quesada gigas, Rastrococcus* spp., *Rhopalosiphum* spp. (*e.g. Rhopalosiphum padi* (bird cherry-oat aphid)), *Saissetia* spp., *Scaphoides titanus, Schizaphis graminum, Selenaspidus articulatus, Sogata* spp., *Sogatella furcifera, Sogatodes* spp., *Stictocephala festina, Tenalaphara malayensis, Tinocallis caryaefoliae, Tomaspis* spp., *Toxoptera* spp., *Trialeurodes* spp., *Trioza* spp., *Typhlocyba* spp., *Unaspis* spp., *Viteus vitifolii* and *Zygina* spp.

Non-limiting examples of the members of the order Lepidoptera include *Acronicta major, Adoxophyes, Aedia leucomelas, Agrotis, Alabama, Amyelois transitclla, Anarsia, Anticarsia, Argyroploce, Barathra brassicae, Borbo cinnara, Bucculatrix thurberiella, Bupalus piniarius, Busseola, Cacoecia, Caloptilia theivora, Capua reticulana, Carpocapsa pomonella, Carposina niponensis, Chematobia brumata, Chilo, Choristoneura, Clysia ambiguella, Cnaphalocerus, Cnephasia, Conopomorpha, Conotrachelus, Copitarsia, Cydia, Dalaca noctuides, Diaphania, Diatraea saccharalis, Earias, Ecdytolopha aurantium, Elasmopalpus lignosellus, Eldana saccharina, Ephestia, Epinotia, Epiphyas postvittana, Etiella, Eulia, Eupoecilia ambiguella, Euproctis, Euxoa, Feltia, Galleria mellonella, Gracillaria, Grapholitha, Hedylepta, Helicoverpa, Heliothis, Hofmannophila pseudospretella, Homoeosoma, Homona, Hyponomeuta padella, Kakivoria flavofasciata, Laphygma, Laspeyresia molesta, Leucinodes orbonalis, Leucoptera, Lithocolletis, Lithophane antennata, Lobesia, Loxagrotis albicosta, Lymantria, Lyonetia, Malacosoma neustria, Maruca testulalis, Mamestra brassicae, Mods, Mythimna separata, Nymphula, Oiketicus, Oria, Orthaga, Ostrinia, Oulema oryzae, Panolis flammea, Parnara, Pectinophora, Perileucoptera, Phthorimaea, Phyllocnistis citrella, Phyllonorycter, Pieris, Platynota stultana, Plodia inter punctella, Plusia, Plutella xylostella, Prays, Prodenia, Protoparce, Pseudaletia, Pseudoplusia includens, Pyrausta nubilalis, Rachiplusia nu, Schoenobius, Scirpophaga, Scotia segetum, Sesamia, Sparganothis, Spodoptera*, (e.g. *Spodoptera exigua* (beet armyworm), *Stathmopoda, Stomopteryx subsecivella, Synanthedon, Tecia solanivora, Thermesia gemmatalis, Tinea pellionella, Tineola bisselliella, Tortrix, Trichophaga tapetzella, Trichoplusia, Tuta absoluta*, and *Virachola*.

Apart from taxonomy, herbivorous insect pests can also be classified by their mode of feeding into feeding guilds, for example as described by Novotny et al., 2010 (incorporated by reference). Major examples of economically relevant feeding guilds include, but are not limited to, leaf chewers, leaf miners, phloem suckers, root chewers, single-cell suckers and gall-makers.

Examples of agronomically significant leaf chewers include the armyworm, *Spodoptera* spp. and grasshoppers,

*Melanoplus* spp. Non-limiting examples of phloem suckers include *Aphis* spp., *Myzus* spp., *Bemisia* spp. and *Nilaparvata* spp. Examples of economically significant root chewers include corn rootworms, *Diobrotica* spp. Examples of leaf miners include *Tuta* spp., *Pegomya* spp. and *Liriomyza* spp. Representative examples of single-cell suckers include *Thrips* spp., *Franklienella* spp and *Halyomorpha* spp.

In particular, the compounds of the present invention have been shown to effectively control arthropod pests that feed on plant sap or phloem (also referred to as "plant sucking" pests). They injure a plant for example by sucking phloem, sap or cytoplasm. These arthropods use highly modified mouthparts (stylets) to navigate through the plant cuticle, epidermis and mesophyll, and establish feeding sites in phloem sieve elements. Hence particular envisaged in the present invention are plant sucking arthropods feeding on plant sap or phloem, in particular phloem-, sap-sucking insects, single cell-feeding insects and/or leaf-miners. Examples of homoptera (e.g. aphids and white flies) are representative for phloem feeding by piercing-sucking. Thysanoptera (thirps) have rasping and (piercing-) sucking feeding mode and mite species (Acari) such as spider mites and the tomato russet mite *Aculops lycopersici* are representative for single cell feeders. All being very important in agriculture, horticulture, forestry. As such, in one embodiment, the present invention provides compounds and methods for the control of aphids, white flies, *thrips* and mites, in particular *thrips* (such as e.g. *Frankliniella occidentalis*), more in particular mites (such as e.g. *Aculops lycopersici, Steneotarsonemus spinki, Tetranychus urticae*).

In more specific embodiments, insect pests that can be controlled by practicing the disclosure herein include, for example, *Bemisia tabaci, Frankliniella occidentalis, Myzus* spp., *Rhopalosiphum padi, Aphis* spp., *Tuta absoluta*, and *Nilaparvata lugens.*

The control of adults and larvae of the order Acari (mites) in plants has also been demonstrated in the present invention. Examples are *Aceria tosichella* Keifer (wheat curl mite); *Petrobia latens* Müller (brown wheat mite); spider mites and red mites in the family Tetranychidae, *Panonychus ulmi* Koch (European red mite); *Tetranychus urticae* Koch (two spotted spider mite); (*T. mcdanieli* McGregor (McDaniel mite); *T. cinnabarinus* Boisduval (carmine spider mite); *T. turkestani* Ugarov & Nikolski (strawberry spider mite); flat mites in the family Tenuipalpidae, *Brevipalpus yotersi* McGregor (citrus flat mite); rust and gall mites in the family Eriophyidae and other foliar feeding mites.

Furthermore, also plagues of *thrips* and the like can be controlled by the methods and compounds of the present invention. *Thrips* belong to the Order Thysanoptera including *Thrips, Franklienella* and *Scirtothrips.*

A particular advantage is that the compound of the invention exhibits no (significant) toxicity and hence has no harmful effects on non-target organisms at a working concentration adapted to be applied to the plant. E.g. the compounds provided herein were demonstrated not to be toxic for mice, flies, bacteria or fungi. Hence in a specific embodiment the compounds of the invention are not considered as insecticidal or acaricidal. Insecticides or acaricides are, by definition, chemicals that kill insects or mites, respectively. Said features can be determined by methods known in the art such as e.g. provided in the examples section or by a direct-contact bioassay such as described by the Insecticide Resistance Action Committee (IRAC), e.g. in (Elias, 2018).

Of particular advantage is that the present compounds can be used pre-emptively or preventive (as a priming agent e.g. applied to seedlings or non-infected plants; or before the growing or reproduction season of the arthropod pest) as well as curative, require only a simple formulation and are highly stable at room temperature. In practice, these priming agents can be used within an integrated crop protection framework: their pre-emptive use will delay or even prevent the arthropod pest from reaching the damage threshold, thus reducing the need for conventional pesticides.

In a further embodiment, the compound of the invention is isolated (e.g. in substantially purified form) or synthetically made using standard techniques, or commercially available. In a particular embodiment, the compound is not part of a natural extract made by extracting a part of a raw material, often by using a solvent such as ethanol or water (e.g. aqueous or ethanolic extracts of seeds or plants; oils). More in particular, the compounds (as part of a composition) are employed in a purity of from 90% to 100%, preferably from 95% to 100% (according to their NMR spectrum).

The present invention also encompasses (the use of) a composition or formulation comprising a compound of the invention. An "agrochemical composition" as used herein means a composition for agrochemical use, such as use in the agrochemical industry (including agriculture, horticulture, floriculture) and home and garden uses for protecting plants or parts of plants, crops, bulbs, tubers, fruits (e.g. from harmful organisms, diseases or pests) as herein defined, comprising at least one active substance of a compound as defined herein, optionally with one or more additives favoring optimal dispersion, atomization, deposition, leaf wetting, distribution, retention and/or uptake of agrochemicals. Typically such composition or formulation further comprises at least one additional component or excipient such as a surfactant, a (solid or liquid) diluent and/or an emulsion stabilizer, which serves as a carrier. The (agrochemical) formulation generally comprises between 0.01 and 95%, preferably between 0.1 and 90%, most preferably between 0.5 and 90%, by weight of active substances. With "surfactant" is meant herein a compound that lowers the surface tension of a liquid, allowing easier spreading. The surfactant can be a detergent, an emulsifier (including alkyl polyglucosides glycerol ester or polyoxyethylene (20) sorbitan monolaurate), a dispersing agent (including sodium chloride, potassium chloride, potassium nitrate, calcium chloride or starch of corn), a foaming agent (including derivates of tartric acid, malic acid or alcohols), a penetration enhancer, a humectant (including ammonium sulfate, glycerin or urea) or a wetting agent of ionic or non-ionic type or a mixture of such surfactants. In particular, the surfactants used in the composition as defined herein are penetration enhancers, dispersing agents or emulsifiers. The term "penetration enhancer" is understood herein as a compound that accelerates the uptake of active ingredient through the cuticle of a plant into the plant, i.e. the rate of uptake, and/or increases the amount of active ingredient absorbed into the plant. Classes of substances known as penetration enhancers, include alkyl phosphates, such as tributyl phosphate and tripropyl phosphate, and naphthalenesulphonic acid salts. With "dispersing agent" is meant a substance added to a suspension, usually a colloid, to improve the separation of particles and to prevent settling or clumping. The term "emulsifier" as used herein refers to a substance that stabilizes an emulsion, i.e. a mixture of two or more liquids. Mention can be made of the emulsifiers sold under the trade names Tween® 20, which essentially comprises polyoxyethylene (20) sorbitan monolaurate (polysorbate 20), and Radia®, which essentially comprises alkyl polyglycosides.

As an example, a surfactant comprises one or more of the following components: castor oil ethoxylate, rapeseed methyl ester, alkyl phosphates, tributyl phosphate, tripropyl phosphate, naphthalenesulphonic acid salts, organic sulfonate/2-methylpentane-2,4-diol, alkylpolyglucoside, siloxanes derivates, alkylsulfonates, polycarboxylates, lignosulfonates, alkoxylated triglycerides, fatty amines polymers, dioctylsulfosuccinates or polyoxyethylene (20) sorbitan monolaurate (polysorbate 20).

An additive, a plant (micro) nutrient, a buffer, a crop oil, a drift inhibitor and/or an (inert) substratum can also be part of the composition. Typically the compound of the invention may be administered to a plant in a suitable agriculturally acceptable formulation, including but not limited to, a growing medium such as soil or hydroponic liquid medium, dusts, granules, solution concentrates, emulsifiable concentrates and wettable powders. The term "agriculturally acceptable" indicates that the formulation is non-toxic and otherwise acceptable for application to a plant, whether applied indoors (e.g. in a contained environment) or outdoors (e.g. in a non-contained environment that is exposed to other plant, animal and human life). The formulation may include additives such as solvents, for example ketones, alcohols, aliphatic ethers, fillers and carriers, for example clay and minerals. The general types of solid compositions are dusts, powders, granules, pellets, prills, pastilles, tablets, filled films (including seed coatings) and the like, which can be water dispersible ("wettable") or water soluble. Films and coatings formed from film forming solutions or flowable suspensions are particularly useful for seed treatment. Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting.

Liquid diluents include, for example, water, NN-dimethylalkanamides (e.g., NN dimethylformamide), limonene, dimethyl sulfoxide, N-alkylpyrrolidones (e.g., N methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and y-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically C6-C22), such as plant seed and fruit oils (e.g., oils of olive, castor, linseed, sesame, corn (maize), peanut, sunflower, grapeseed, safflower, cottonseed, soybean, rapeseed, coconut and palm kernel), animal sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, Solvents Guide, 2nd Ed., Interscience, New York, 1950.

In a particular embodiment, the invention provides a fibrous composition comprising a non-woven fiber and an effective amount of at least one compound as provided herein, covalently attached or stably adsorbed to the fiber.

The composition or formulation will typically contain effective amounts of the compound as described herein. An "effective amount" means that they are used in a quantity which allows to obtain the desired effect but which does not give rise to any phytotoxic symptom on the treated plant. A particular embodiment uses the compound of the invention, which advantageously can be administered in concentrations up to 400 μM, 500 μM, 600 μM, 700 μM, 800 μM, 900 μM, 1000 μM, 1500 μM or 2000 μM; or in concentrations ranging from about 0.1 μM to about 1500 μM, more specific at concentrations ranging from about 0.1 μM to about 800 μM, even more specific from about 0.1 μM to about 500 μM; and more in particular at concentrations of at least or around or from 1, 5, 10, 15, 20, 25, 30, 35, 40, 45, 50, 55, 60, 65, 70, 75, 80, 85, 90, 95, 100, 150, 200, 300, 400, 500, 600, 700, 800, 900 to 1000 μM. In particular, the amount used is non-insecticidal and non-acaricidal.

The compounds of the invention can be used individually or already partially or completely mixed with one another to prepare the composition according to the invention. It is also possible for them to be packaged and used further as combination composition such as a kit of parts. According to the method of the present invention, the compounds or composition according to the invention can be applied once to a soil/plant (part)/crop, or it can be applied two, three or more times after each other with an interval (e.g. of 1 week, 2 weeks, 3 weeks, 4 weeks, . . . ) between every two applications.

Any plant/crop can be treated, at any stage of development. The term "plant (or plants)" is a synonym of the term "crop" which is to be understood as a plant of economic importance and/or a men-grown plant. The methods, compounds and compositions of the present invention may be applied to any monocot or dicot plant, depending on the pathogen control desired. Plants that can be protected from insect and/or mite pests according to the disclosure herein include crop plants. Illustrative crop plants that can be protected according to the disclosure herein include, for example, corn, cotton, soybeans, cereals, peanuts, sunflower, dry beans, tomato, peas, legume vegetables, sugarcane, rice, alfalfa, and canola. Ornamental plants can be protected in a similar manner.

Non-limiting examples of plants that may be protected in accordance with the compounds and methods described herein include monocotyledon crops such as corn, wheat, barley, rye, sugar cane, rice, sorghum, oat; dicotyledon crops such as cotton, sugar beet, peanut, potato, sweet potato, yam sunflower, soybean, alfalfa, flax, canola, grapes, tobacco; vegetables including Solanaceae vegetables such as eggplant, tomato, green pepper and pepper; Cucurbitaceae vegetables such as cucumber, pumpkin, zucchini, watermelon, melon, and squash; Brassicaceae vegetables such as radish, turnip, horseradish, Chinese cabbage, cabbage, leaf mustard, broccoli and cauliflower; Asteraceae vegetables such as artichoke and lettuce; Liliaceae vegetables such as leek, onion, garlic, and asparagus; Apiaceae vegetables such as carrot, parsley, celery and parsnip; Chenopodiaceae vegetables such as spinach and chard; Lamiaceae vegetables such as mint and basil; flowers such as *petunia*, morning glory, carnation, *chrysanthemum* and rose; foliage plants; fruit trees such as pome fruits (e.g., apple, pear and Japanese pear), stone fruits (e.g., peach, plum, nectarine, cherry, apricot, and prune), citrus (e.g., orange, lemon, lime and grapefruit), tree nuts (e.g., chestnut, pecan, walnut, hazel, almond, pistachio, cashew, and macadamia), berries such as blueberry, cranberry, blackberry, strawberry, and raspberry; persimmon; olive; loquat; banana; coffee; palm; cocoa; the other trees such as tea, mulberry, flower trees, and landscape trees (e.g., ash, birch, dogwood, *eucalyptus*, ginkgo, lilac, maple, oak, poplar, *Formosa* sweet gum, sycamore, fir, hemlock fir, needle juniper, pine, spruce, and yew); and turf.

In a specific embodiment, the plants to be treated are these crops with the greatest estimated losses due to insect and mite parasitism i.e. corn, cotton, cucurbits, leguminous vegetables, peanut, solanaceous vegetables (e.g. tomato), lettuce, strawberry, potato, onion, wheat, rice, banana, tree fruits (e.g. apple, citrus), coffee, soybean, sugarcane, sugar beet and tobacco, more in particular solanaceous vegetables (e.g. tomato, patato, eggplant, *capsicum* and chillies) and wheat. In one embodiment, the plants to be treated according to the methods provided herein are tomato, wheat, cotton and pepper.

In a further embodiment of the present invention, the compound or a composition comprising the compound is applied to a plant, directly or indirectly. Any appropriate plant part can be treated or used including plant organs (e.g., leaves, stems, roots, etc.), seeds, and plant cells and progeny of the same. In the alternative, the compound or composition can be applied to the soil surrounding the plant. The applying of the compound is prior to planting, at planting, or after planting. In one embodiment, contacting includes direct application to a plant. All or part of a plant including, without limitation, leaves, stems, seeds, roots, propagules (e.g., cuttings), fruit, etc., may be contacted with the one or more of the compounds described herein. Contacting may also be carried out indirectly, via application, e.g., to soil or other plant substrates.

Suitable application methods include high or low-pressure spraying, immersion, atomizing, foaming, fogging, coating, and encrusting. Other suitable application procedures can be envisioned by those skilled in the art. In a particular embodiment, the compounds of the invention are applied to the parts of the plant above ground or to the foliage of the plant by spraying e.g. by the use of (mechanical) sprayers. Sprayers convert a formulation of the invention which is mixed with a liquid carrier, such as water or fertilizer, into droplets. The droplets can be any size. Boom sprayers and air blast sprayers can also be used to apply formulations of the invention to pre-emergent or post-emergent crops. Air blast sprayers inject formulations of the invention mixed with a liquid carrier into a fast-moving air stream. Boom sprayers, aerial sprayers, ultra-low volume sprayers, drip irrigation, sprinkler irrigation, and foggers can also be used to apply formulations of the invention. Where the formulations of the invention are in a solid, powder or granule form, they can be applied with granule or dust application equipment. Formulations of the invention can also be applied to soil, plant media, plants, plant tissues or seeds as a fumigant.

Application can be a single application or a repeated application, e.g. two, three, four or more times, e.g. with a weekly, bi-weekly, three-weekly or monthly interval.

In another embodiment, seeds of a plant are coated with the compound of the invention ("coated seeds"). Any appropriate seed coating method known the skilled person can be used. E.g. seeds can be treated with the compounds of the invention in multiple ways including, without limitation, via spraying or dripping, drenching, or pellet application. Spray and drip treatment can be conducted, for example, by formulating an effective amount of the compound in an agronomical acceptable carrier, typically aqueous in nature, and spraying or dripping the composition onto seed via a continuous treating system (which is calibrated to apply treatment at a predefined rate in proportion to the continuous flow of seed), such as a drum-type of treater. Such methods include those that can advantageously employ relatively small volumes of carrier so as to allow for relatively fast drying of the treated seed. Large volumes of seeds can be efficiently treated. Batch systems, in which a predetermined batch size of seed and signal molecule compositions are delivered into a mixer, can also be employed. Systems and apparatuses for performing these processes are commercially available from numerous suppliers. The present invention also provides a seed coated with one or more of the compounds/composition of the present invention.

In another aspect, the compound or composition can be applied to the soil directly, e.g. by drench application (soil drench). A soil drench applies the compound, optionally mixed with water, to the soil around the base of a plant so that its roots can absorb the compound.

In a specific embodiment, the compounds of the present invention can be applied to a plant as provided herein alone, in combination or in a mixture with other compounds. Suitable other compounds include effective amounts of other agricultural or horticultural chemicals, such as herbicides, insecticides, nematicides, molluscicides, bactericides, acaricides, fungicides, and/or plant growth regulators or fertilizers.

In yet another embodiment the invention provides a method for the manufacture ('or the production of' which is equivalent wording) an (agrochemical) composition according to the invention, comprising formulating a compound of the invention, and in particular a molecule of formula I, Ie, II, III or IV (including any subgroup and compounds of Table 1) as defined herein before, together with at least one customary agrochemical auxiliary agent. Suitable manufacturing methods are known in the art and include, but are not limited to, high or low shear mixing, wet or dry milling, drip-casting, encapsulating, emulsifying, coating, encrusting, pilling, extrusion granulation, fluid bed granulation, co-extrusion, spray drying, spray chilling, atomization, addition or condensation polymerization, interfacial polymerization, in situ polymerization, coacervation, spray encapsulation, cooling melted dispersions, solvent evaporation, phase separation, solvent extraction, sol-gel polymerization, fluid bed coating, pan coating, melting, passive or active absorption or adsorption. Customary agrochemical auxiliary agents are well-known in the art and include, but are not limited to aqueous or organic solvents, buffering agents, acidifiers, surfactants, wetting agents, spreading agents, tackifiers, stickers, carriers, fillers, thickeners, emulsifiers, dispersants, sequestering agents, anti-settling agents, coalescing agents, rheology modifiers, defoaming agents, photo-protectors, anti-freeze agents, biocides, penetrants, mineral or vegetable oils, pigments and drift control agents or any suitable combination thereof.

The following examples are set forth below to illustrate the methods, compositions, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

EXAMPLES

Materials and Methods

Plant Materials

Tomato (*Solanum lycopersicum*)

Tomato (cv. Moneymaker) seeds were obtained from Vreeken's Zaden (Dordrecht, the Netherlands). Seeds were germinated on potting soil at 22° C.; seedlings were then transferred to individual pots filled with potting soil and placed in a growth chamber at 24° C. with 16 hours per day of fluorescent light.

Wheat (*Triticum aestivum*)

Winter wheat (cv. Sahara) seeds were obtained from Aveve Agrarisch (Landen, Belgium). Seeds were washed with a 10% ethanol solution to remove residual fungicide traces and then germinated on wet paper at room temperature. Seedlings were transferred to potting soil and placed in a growth chamber at 22° C. with 16 hours per day of fluorescent light.

Cotton (*Gossypium hirsutum*)

Cotton seeds were germinated in individual pots filled with potting soil and placed in a greenhouse with supplemental lighting (16 hours of light per day).

Pepper (*Capsicum annuum*)

Pepper seedlings (cv. Cayenne long slim) were transferred to individual pots with potting soil two weeks after sowing. Plants were maintained in a growth room (25° C., 16:8 L:D) for two additional weeks. Plants were removed from the soil and placed with their roots in water (to accommodate the Plexiglas cage system) at the onset of *thrips* infestation (4 weeks old).

Chemicals

A 100 mM piperonylic acid stock was prepared by dissolving piperonylic acid (Sigma-Aldrich, Saint-Louis, USA) in DMSO (Duchefa Biochemie, Haarlem, the Netherlands). Before use, this stock solution was diluted with distilled water to a concentration of 300 μM and mixed with 0.1 v/v % Tween 20. Working solutions of 1000 μM PA (*Aculops* experiment) were prepared in a similar manner from a 300 mM stock solution. The resulting spraying solution was applied to plants until run-off using an atomizer. As a control, a solution consisting of an equivalent amount of DMSO and Tween 20 was used in the same manner. Plants were sprayed twice, one and eight days before inoculation. The tomato plants used in the spider mite experiment were sprayed a final time five days after inoculation, but only on the non-inoculated leaves to avoid direct effects of the spray on the mites.

Mite and Insect Experiments

Two-Spotted Spider Mite (*Tetranychus urticae*)

*T. urticae* mites (strain: London; grown on tomato for several generations) were reared on tomato plants in a growth chamber at 24° C.

Tomato plants in the early four-leaf stage were inoculated with *T. urticae* by placing ten adult females on the second leaf of each plant. The inoculated plants were then placed in an incubator at 24° C. and 16 hours per day of fluorescent light. Care was taken to avoid leaves from touching each—other to avoid movement between plants. After ten days, the second leaf was detached, imaged using a digital camera and placed under a binocular microscope. All moving mites present on the leaf were counted (regardless of life stage).

Bird Cherry-Oat Aphid (*Rhopalosiphum padi*)

In the first experiment, *R. padi* aphids were reared on barley plants grown at room temperature. Pots containing five wheat seedlings of approximately two weeks old each were inoculated with *R. padi* by placing one adult, wingless female on each wheat seedling. Each pot was then placed in a separate plexiglass cylinder covered with a mesh gauze to prevent movement of aphids between plants and moved to a 22° C. incubator with 16 hours of fluorescent light per day. Twenty-four hours later, the number of remaining adults on each pot was recorded. Ten days later, the number of aphids in each pot was counted. The reproductive factor was calculated by dividing the number of aphids counted after ten days by the number of remaining adult females twenty-four hours after inoculation.

In the second experiment, *R. padi* aphids were reared on barley plants grown at room temperature. The aphids were then synchronized by picking recently hatched individuals on detached wheat leaves kept in water agar for one week. Three synchronized adult females each were placed pots containing five wheat seedlings of approximately two weeks old placed in separate plexiglass cylinders covered with mesh gauze to prevent movement of aphids between plants. The plants were kept in a growth chamber at 24° C. with 16 hours of fluorescent light per day. Twenty-four hours later, the number of remaining adults on each pot was recorded. Ten days later, the number of aphids in each pot was counted. The reproductive factor was calculated by dividing the number of aphids counted after ten days by the number of remaining adult females twenty-four hours after inoculation.

Tobacco Whitefly (*Bernisia tabaci*)

*B. tabaci* (biotype Q) was reared on cotton plants under controlled laboratory conditions. Approximately sixty mixed-sex adults were collected and placed in ventilated vials attached to the leaves of two-week old cotton plants. After being allowed to oviposit for 24 hours, the adults were removed. Eight days after oviposition, leaves were detached and the number of unhatched eggs, crawlers and nymphs per plant was recorded.

Tomato Russet Mite (*Aculops lycopersici*)

*A. lycopersici* was reared on tomato plants in an incubator at 27° C.; 50% RH and 16:8 L:D. For inoculation of the PA-treated (300 μM or 1000 μM) or Control plants, 30 mites were transferred with a fine brush to a small leaf disk (1 cm), which was then placed on top of the plants. The mites were allowed the reproduce on the tomato plants during ten days, after which the total number of mites was compared.

Western Flower *Thrips* (*Frankliniella occidentalis*)

*F. occidentalis* was reared on bean pods in an incubator at 28° C.; 70% RH and 16:8 L:D. For inoculation of the PA-treated (300 μM) or Control plants, 10 females (two days old since turning adult) were transferred with a fine brush to a pepper plant inside a Plexiglas cage. After four days, all females were removed, while their progeny was counted three days later.

Evaluation of Acute Toxicity

*Spodoptera exigua*—*S. exigua* was reared on an artificial diet in a 24° C. incubator. Recently molted L3 larvae were placed in petri dishes containing tissue paper and 2 g of artificial feed pellets. Both tissue paper and pellets were wetted with 10 ml of either distilled water or distilled water containing 300 μM PA. Twenty-four and seventy-two hours later, the number of surviving caterpillars was counted. A caterpillar was considered alive if it was either actively moving, or if it moved when gently prodded. It was also recorded whether a caterpillar was feeding (present on a feed pellet) to measure whether PA-treated feed pellets were repellent to the caterpillar.

*Tetranychus urticae*—Spider mites of a laboratory reference strain were collected and placed on arenas consisting of a square bean leaf disc, placed on wet cotton wool and lined with paper tissue. Each arena received 25 to 30 adult female mites. The arenas were then sprayed in a custom-build spray tower with either 300 μM PA or control solution, six replicates each. The mites were incubated at 25° C., 18:6 L:D. Mortality was scored after 24 h. Mites were scored as either drowned (in water barrier), alive or dead (not moving its own body length within 10 seconds after prodding with a tiny brush).

*Aculops lycopersici*—Tomato russet mites were collected from a lab culture and transferred to a tomato leaf disk placed on agar. Each disk received 25 to 30 adult mites. The disks with mites were then sprayed in a custom-build spray tower with either 300 μM PA or control solution, six replicates each. The russet mites were incubated at 25° C., 18:6 L:D. Mortality was scored after 24 h. Mites were scored as either lost (in agar barrier), alive or dead.

Greenhouse Experiment

Rice seeds (cv. Kitaake) were sterilized and germinated on wet paper in the dark at 30° C. Seedlings were transferred to sterilized potting soil and placed in a climate-controlled compartment at the Ghent University greenhouse complex (Melle, Belgium). The compartment was known to host a natural mite infestation; the causal mite had previously been identified as *Steneotarsonemus spinki* by professor Thomas van Leeuwen of the agrozoology lab at Ghent University. Pots were arranged in a completely randomized manner in the same tray.

Data Analysis

All statistical analysis was performed in R (v. 3.5.0). Statistical graphics were created using ggplot2. For the *T. urticae* experiment, the number of mites was compared using a quasipoisson model, whereas the lesion area was analyzed using a gaussian model. The number of aphids per pot was analyzed using a gaussian model. Finally, the weight gain of *S. exigua* was analyzed using a general linear mixed model implemented in the Ime4 package with the weight of a larva as the independent variable, treatment (PA or control) as the dependent variable and the host tomato plant as a random effect. In all cases, model assumptions were verified using diagnostic plots.

Images of tomato leaves damaged by *S. exigua* were analyzed using the ImageJ software. For *T. urticae* damage, the total area of the second leaf of each plant was quantified using the polygon selection tool. Then, the total area of chlorotic patches on the leaf was measured in the same manner and the ratio of both values was calculated to obtain the percentage of chlorotic leaf.

Results

Example 1: Reduction of *Tetranychus urticae* Reproduction on Tomato (*Solanum lycopersicum* cv. Moneymaker)

In this experiment, the ability of a foliar spray containing piperonylic acid (PA) to pre-emptively control the two-spotted spider mite *Tetranychus urticae* in tomato was demonstrated.

The results of the experiment are summarized in FIG. 1. Treatment with piperonylic acid reduced the percentage of visibly chlorotic leaf area (−62%, $p=0.0021$) and the number of mites present on the leaf (−49%, $p=0.0041$). Moreover, the number of mites per leaf showed a highly significant linear correlation with the chlorotic leaf area (Pearson correlation coefficient: 0.895; $p<0.0001$).

These data show that PA treatment reduces the fertility and hence number of *T. urticae* individuals on tomato plants. The reduction in *T. urticae* number also leads to a corresponding decrease in chlorotic leaf area and hence damage to the host plant.

Example 2: Reduction of *Rhopalosiphum padi* Reproduction on Wheat (*Triticum aestivum* cv. Sahara)

In this experiment, the ability of a foliar spray containing piperonylic acid (PA) to pre-emptively control the bird cherry-oat aphid *Rhopalosiphum padi* in wheat was demonstrated.

Figure 2:
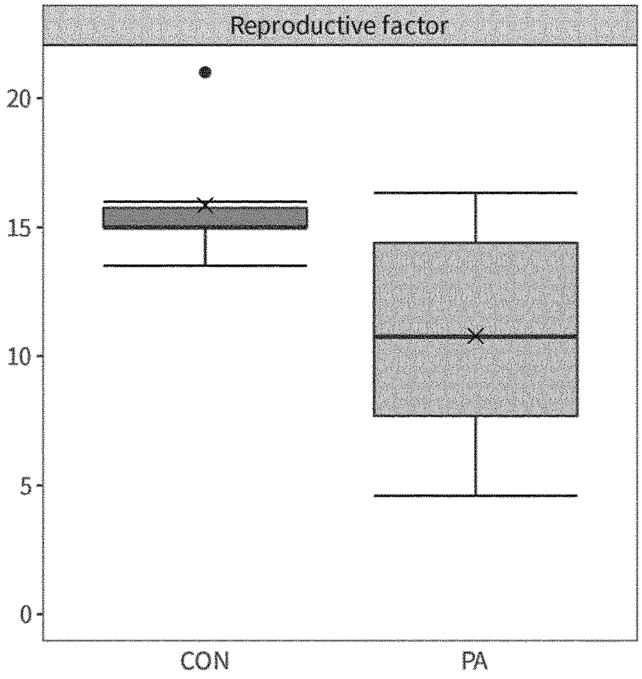
FIG. 2: box plots of the reproductive factor of *Rhopalosiphum padi* on wheat plants treated with 300 μM piperonylic acid (PA) or a water control treatment (CON). N=8 (eight pots containing five plants each per treatment).
Figure 3:
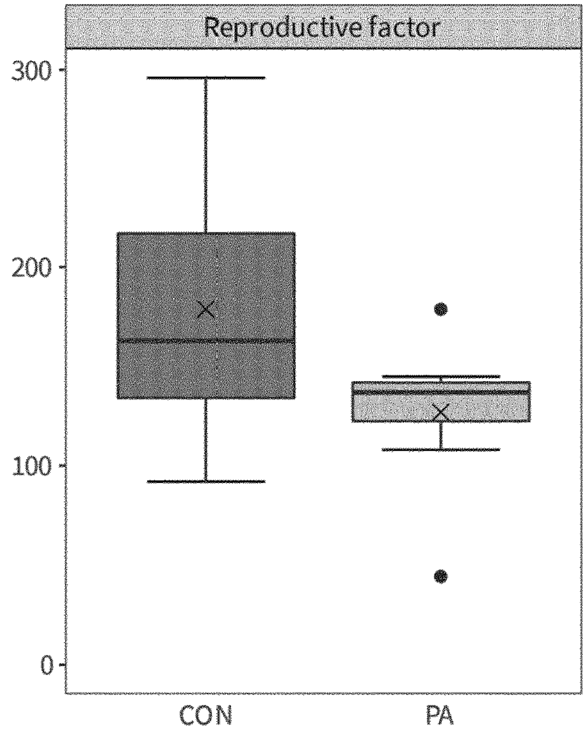
FIG. 3: box plots of the reproductive factor of *Rhopalosiphum padi* on wheat plants treated with 300 μM piperonylic acid (PA) or a water control treatment (CON). N=8 (eight pots containing five plants each per treatment).

The results of the experiment are summarized in FIG. 2 (first experiment) and FIG. 3 (second experiment). Treatment with piperonylic acid significantly reduced the reproductive factor of *R. padi* on wheat in both the first and second experiment (−32%, $p=0.0275$ and 29%, $p=0.0407$ respectively).

Example 3: Inhibition of Tobacco Whitely (*Bemisia tabaci*) on Cotton Treated with a C4H Inhibitor In this experiment, the ability of a foliar spray containing piperonylic acid (PA) to pre-emptively control the tobacco whitefly *Bemisia tabaci* in cotton was demonstrated.

Figure 4:
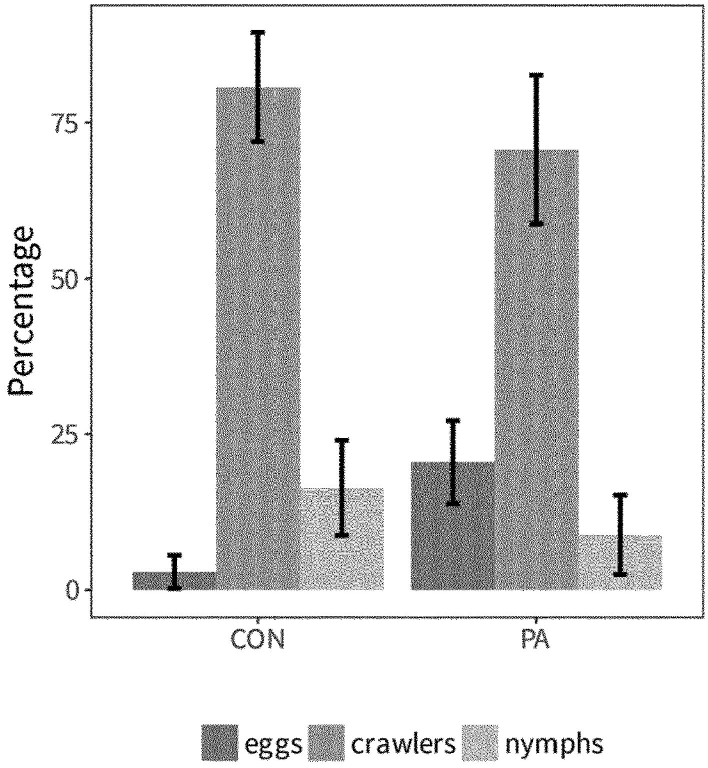
FIG. 4: bar charts of the development of eggs deposited by *Bemisia tabaci* on cotton plants treated with 300 μM piperonylic acid (PA) or a water control treatment (CON). 'Eggs' refers to unhatched eggs; 'crawlers' are first instar larvae and 'nymphs' are second instar larvae. N=8 (eight cotton plants per treatment; 60 *B. tabaci* adults were allowed to oviposit per plant).

The results of the experiment are summarized in FIG. 4. Treatment with piperonylic acid did not affect the number of eggs deposited on cotton plants ($p=0.3810$), but did significantly inhibit egg hatching and slowed the development from crawler (first instar) to nymph (second instar). In control-treated plants, 3% of eggs had not hatched after eight days; in PA-treated plants, 20% had failed to hatch ($p=0.0009$). Of all eggs deposited on control plants, 16% had developed into nymphs, whereas a significantly smaller 9% had done so on PA-treated plants ($p=0.02731$).

Example 4: Treatment with C4H Inhibitors Improves Yield in Rice (*Oryza sativa* cv. Kitaake) Under Panicle Rice Mite (*Steneotarsonemus spinki*) Stress To determine the effects of C4H inhibition on yield and fertility in the presence of mites, rice (*Oryza sativa* cv. Kitaake) was grown in a greenhouse until maturity and treated with a control or 300 μM PA foliar spray at bi-weekly intervals. This greenhouse is naturally infested with the panicle rice mite (*Steneotarsonemus spinki*).

Three months after emergence, PA-treated rice plants had developed more tillers and had fewer empty panicles, which led to a significantly increased number of seeds (+104%, $p<0.0001$). Moreover, seeds from PA-treated plants showed a higher germination rate after seven days on wet paper (+45%, $p=0.0253$), which is indicative of higher seed quality. These data show that PA treatment improve plant yield and fertility under arthropod stress.

Example 5: PA Treatment Reduces the Population Growth of the Tomato Russet Mite (*Aculops lycopersici*)

Figure 5:
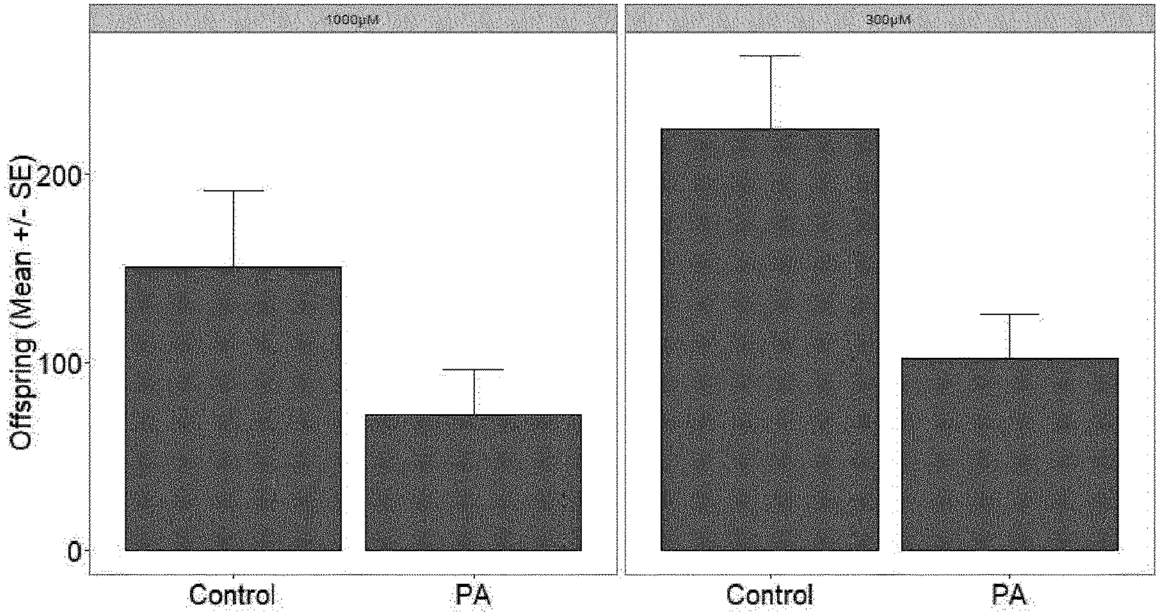
FIG. 5: bar chart of the number of tomato russet mites (*Aculops lycopersici*) (mean±se) recovered from tomato plants treated with control solution or piperonylic acid (PA) (1000 μM (left) or 300 μM (right)), ten days after inoculation with 30 adults. N=5

A strong trend towards a reduced russet mite population growth was observed when mites were fed on tomato plants treated with 300 or 1000 μM PA, versus control plants. A reduction of about 50% was observed for both concentrations (FIG. 5). Due to the high variability, however, this reduction was not significant (Mann-Whitney U test; $p=0.052$ and 0.089 resp.).

Example 6: PA Treatment Reduces the Population Growth of the Western Flower *Thrips* (*Frankliniella occidentalis*)

Figure 6:
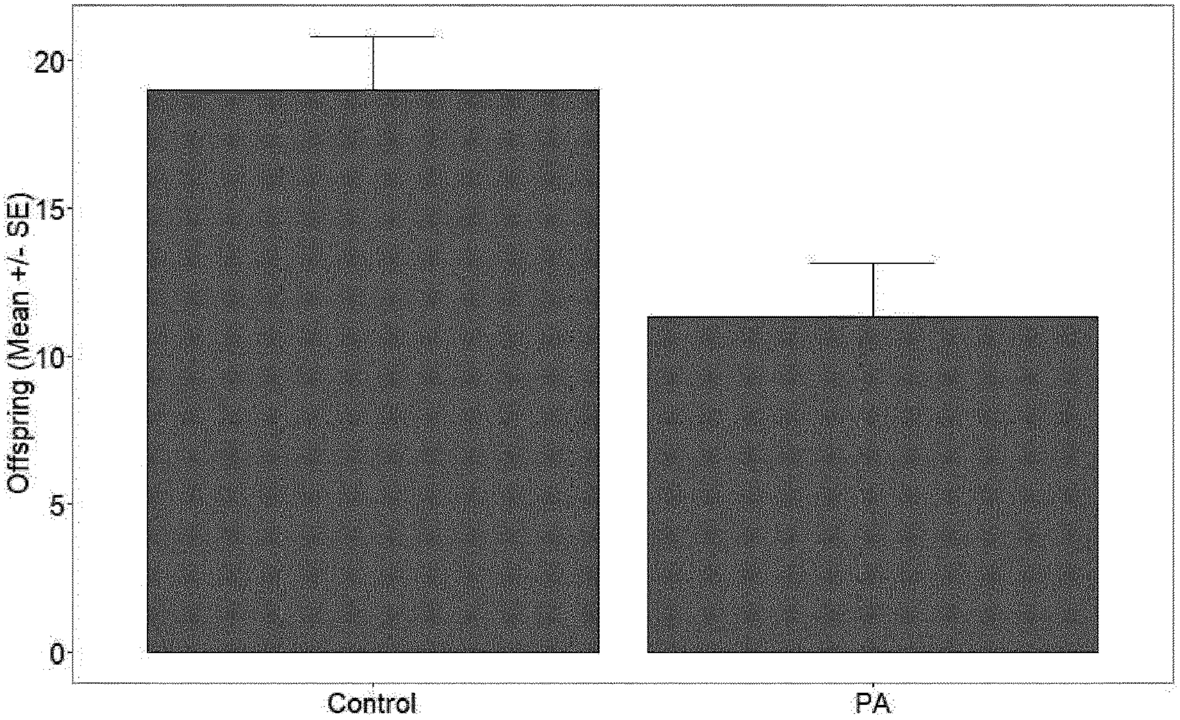
FIG. 6: bar chart representing the number of *thrips* larvae (*Frankliniella occidentalis*) (mean±se) recovered from pepper plants (*Capsicum annuum*) treated with control solution or piperonylic acid (PA, 300 μM). N=6

Treating pepper plants with PA significantly reduced the number of progeny counted three days after a four-day infestation period with ten adults (Kruskal Wallis test; $p=0.018$), as almost twice as many larvae could be recovered from control plants as from PA-treated plants (19.0±1.84 and 11.33±1.82 larvae respectively (mean±SE); FIG. 6).

Example 7: The C4H Inhibitor Piperonylic Acid is not Directly Toxic to Arthropod Pests

*S. exigua*—Direct toxicity of piperonylic acid (PA) was determined using the protocol outlined in the materials and methods section. Briefly, 30 recently molted L3 larvae were placed per petri dish containing tissue paper and food pellets that had been wetted with either a 300 μM piperonylic acid solution or a water control.

After twenty-four hours, 29 out of 30 L3 larvae were alive in the control petri dish and 28 out of 30 were alive in the PA-treated dish. After seventy-two hours, 29 larvae were alive in the control and 27 in the PA-treated dish. Survival was hence identical between both groups ($p=0.6111$).

*T. urticae*—Direct toxicity of PA to spider mites was evaluated by spraying mites on leaf disks with either 300 μM PA or control solution. No significant difference in spider mite mortality was observed after 24 h (Fisher test; $p=1$).

*A. lycopersici*—Direct toxicity of PA to russet mites was evaluated by spraying mites on leaf disks with either 300 μM PA or control solution. No significant difference in russet mite mortality was observed after 24 h (Fisher test; $p=0.20$).

REFERENCES

Elias, J. (2018) *IRAC Approved Test Methods*. Available at: https://www.irac-online.org/methods/(Accessed: 13 Dec. 2018).

Novotny, V. et al. (2010) 'Guild-specific patterns of species richness and host specialization in plant-herbivore food webs from a tropical forest', *Journal of Animal Ecology*. John Wiley & Sons, Ltd (10.1111), 79(6), pp. 1193-1203. doi: 10.1111/j.1365-2656.2010.01728.x.

Schalk, M. et al. (1998) 'Piperonylic acid, a selective, mechanism-based inactivator of the trans-cinnamate 4-hydroxylase: A new tool to control the flux of metabolites in the phenylpropanoid pathway', *Plant physiology*. American Society of Plant Biologists, 118(1), pp. 209-18. doi: 10.1104/PP.118.1.209.

Schoch, G. A. et al. (2002) 'Chemical inactivation of the cinnamate 4-hydroxylase allows for the accumulation of salicylic acid in elicited cells.', *Plant physiology*. American Society of Plant Biologists, 130(2), pp. 1022-31. doi: 10.1104/pp.004309.

Steenackers, W. J. et al. (2016) 'The allelochemical MDCA inhibits lignification and affects auxin homeostasis.', Plant physiology. doi: 10.1104/pp.15.01972.

Van de Wouwer, D. et al. (2016) 'Chemical Genetics Uncovers Novel Inhibitors of Lignification, Including p-Iodobenzoic Acid Targeting CINNAMATE-4-HYDROXYLASE.', *Plant physiology*. American Society of Plant Biologists, 172(1), pp. 198-220. doi: 10.1104/pp.16.00430.

The invention claimed is:

1. A method for controlling and/or treating arthropod pests on a plant, the method comprising:

applying to the plant or a part thereof, or to soil surrounding the plant, or to a substrate surrounding the plant, or to water surrounding the plant, an effective amount of a cinnamate-4-hydroxylase (C4H) inhibitor compound, stereoisomer thereof, tautomer thereof, hydrate thereof, salt thereof, ester thereof, or solvate thereof, wherein the C4H inhibitor compound is selected from the group consisting of piperonylic acid, 3,4-methylenedioxycinnamic acid, piperic acid, 3,4-(methylenedioxy) phenylacetic acid, 4-iodobenzoic acid, 4-trifluoromethylbenzoic acid, 4-propynyloxybenzoic acid, 4-propynyloxymethylbenzoic acid, 3-propynyloxybenzoic acid, 3-(4-pyridyl) acrylic acid, 2-hydroxy-1-naphthoic acid, whereby the C4H inhibitor compound or the stereoisomer, tautomer, hydrate, salt, ester, or solvate thereof inhibits C4H in the plant, thereby inhibiting egg hatching, reproduction, and/or development of the arthropod pests that feed on the plant.

2. The method according to claim 1, wherein the C4H inhibitor compound is applied pre-emptively, either as a priming agent to seedlings or non-infected plants, or before a growth or reproduction season of the arthropod pests.

3. The method according to claim 1, wherein the arthropod pests are an herbivorous insect or mite.

4. The method according to claim 1, wherein the arthropod pests are a phloem- or sap-sucking insect, aphid, thrip, or mite.

5. The method according to claim 1, wherein the arthropod pests are a phloem- or sap-sucking insect or aphid.

6. The method according to claim 5, wherein the phloem- or sap-sucking insect or aphid is selected from the group consisting of *Spodoptera* spp., *Melanoplus* spp., *Aphis* spp., *Rhopalosiphum* spp, *Myzus* spp., *Bemisia* spp., *Nilaparvata* spp., *Diobrotica* spp., *Tuta* spp., *Pegomya* spp., *Liriomyza* spp., and *Halyomorpha* spp.

7. The method according to claim 1, wherein the arthropod pest is a mite of order Acari.

8. The method according to claim 7, wherein the mite of order Acari is selected from the group consisting of *Aculops lycopersici, Aceria tosichella* Keifer, *Petrobia latens* Müller, *Panonychus ulmi* Koch, *Tetranychus urticae* Koch, *T. mcdanieli* McGregor, *T. cinnabarinus* Boisduval, *T. turkestani* Ugarov & Nikolski, and *Brevipalpus yotersi* McGregor.

9. The method according to claim 1, wherein the arthropod pests are a thrip of order Thysanoptera.

10. The method of claim 9, wherein the thrip of order Thysanoptera is *Frankliniella occidentalis*.

11. The method according to claim 1, wherein the C4H inhibitor compound is pure.

12. The method according to claim 1, wherein the C4H inhibitor compound is applied as a part of a composition comprising the C4H inhibitor compound in combination with at least one of a diluent, an additive, a plant nutrient or micronutrient, an emulsion stabilizer, a surfactant, a buffer, a crop oil, a drift inhibitor, a substratum, or an inert substratum.

13. The method according to claim 12, wherein the composition has a concentration of the C4H inhibitor compound from 0.1 μM to 1000 μM.

14. The method according to claim 12, wherein the composition further comprises at least one of an herbicide, an insecticide, a nematicide, a molluscicide, a bactericide, an acaricide, a fungicide, a plant growth regulator, or a fertilizer.

15. The method according to claim 1, wherein the C4H inhibitor compound is applied to leaves of the plant, to a fruit of the plant, to a fruit body of the plant, to a stem of the plant, to a shoot of the plant, to a stalk of the plant, to a flower of the plant, as a coating to seeds of the plant, as a soil or root drench, or as an additive to a growth substrate.

16. The method according to claim 1, wherein the C4H inhibitor compound is applied by high or low-pressure spraying, immersion, atomizing, foaming, fogging, coating, or encrusting.

17. The method according to claim 1, further comprising at reapplying the C4H inhibitor compound to the plant or part thereof at least once.

18. The method according to claim 1, wherein the method results in an increase of plant defense in a healthy plant, or in a decrease in disease severity of a plant or a population of plants, or in a decrease in a number of affected plants in a plant population.

* * * * *